(12) United States Patent
Dimou

(10) Patent No.: US 7,743,287 B2
(45) Date of Patent: Jun. 22, 2010

(54) USING SAM IN ERROR CORRECTING CODE ENCODER AND DECODER IMPLEMENTATIONS

(75) Inventor: Georgios D. Dimou, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 350 days.

(21) Appl. No.: 11/860,490

(22) Filed: Sep. 24, 2007

(65) Prior Publication Data
US 2008/0098281 A1 Apr. 24, 2008

Related U.S. Application Data

(60) Provisional application No. 60/829,917, filed on Oct. 18, 2006.

(51) Int. Cl.
*G11C 29/00* (2006.01)
(52) U.S. Cl. .................. 714/702; 714/755; 714/763
(58) Field of Classification Search ............. 714/702, 714/755, 763
See application file for complete search history.

(56) References Cited

U.S. PATENT DOCUMENTS

| | | | |
|---|---|---|---|
| 5,751,741 A * | 5/1998 | Voith et al. ................ 714/758 |
| H1741 H | 7/1998 | Cruts | |
| 6,378,051 B1 | 4/2002 | Henson et al. | |
| 6,484,283 B2 * | 11/2002 | Stephen et al. ............ 714/786 |
| 6,735,734 B1 * | 5/2004 | Liebetreu et al. .......... 714/775 |
| 6,799,295 B2 * | 9/2004 | Nguyen ................... 714/794 |
| 6,813,742 B2 * | 11/2004 | Nguyen ................... 714/794 |
| 6,854,077 B2 * | 2/2005 | Chen et al. ............... 714/702 |
| 7,100,101 B1 * | 8/2006 | Hemphill et al. .......... 714/755 |
| 7,343,530 B2 * | 3/2008 | Shin ....................... 714/702 |
| 2002/0163880 A1 | 11/2002 | Matsumoto | |
| 2003/0093753 A1 | 5/2003 | Okamura et al. | |
| 2005/0084032 A1 | 4/2005 | Rosen et al. | |
| 2006/0085719 A1 | 4/2006 | Orio | |

OTHER PUBLICATIONS

International Search Report for Application No. PCT/US2007/081436 dated Apr. 30, 2008, 1 page.

* cited by examiner

*Primary Examiner*—Esaw T Abraham
(74) *Attorney, Agent, or Firm*—Townsend and Townsend and Crew LLP

(57) ABSTRACT

SAM is a very attractive memory option for systems due to its higher speed and reduced area when compared to RAM. However it is generally not used in implementations of FECCs due to its limitation to sequential accesses. According to the present invention, Forward Error Correcting Code encoder and decoder structures are shown to allow the use of SAM in their memory designs. Thus SAM is utilized in FECC implementations to achieve better area efficiency for the same amount of memory as well as higher throughput for the hardware implementations.

12 Claims, 2 Drawing Sheets

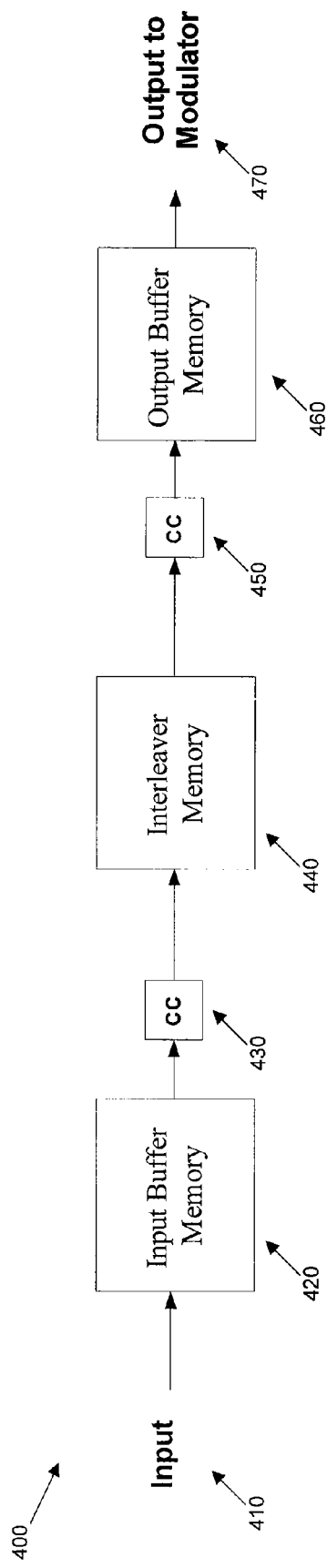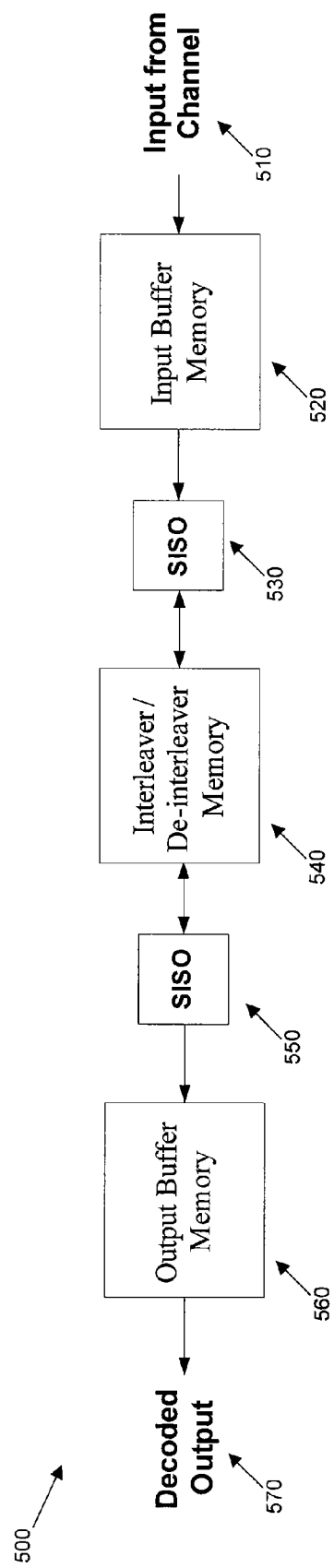

USING SAM IN ERROR CORRECTING CODE ENCODER AND DECODER IMPLEMENTATIONS

CROSS-REFERENCES TO RELATED APPLICATIONS

This application claims the benefit of U.S. Provisional No. 60/829,917, filed on Oct. 18, 2006, the full disclosure of which is incorporated herein by reference.

BACKGROUND OF THE INVENTION

The present invention relates generally to data encoding and in particular to error correcting code encoder and decoders.

The transmission of data through a noisy channel could introduce errors into the data stream. In order to reduce the amount of errors in the transmitted sequence and to avoid retransmissions coding techniques have been developed that provide the ability to detect and correct errors in a sequence. This is achieved usually through the addition of redundant information as part of the transmission. Here the term transmission is used broadly to include transfer of data through different types of medium. This can include communication mediums such as those used in wired, wireless, satellite, and other technologies. This can also include storage mediums such as magnetic, semiconductor, and other types of memory.

Some of the most popular and powerful coding techniques use Forward Error Correcting Codes (FECC) that operate on blocks of data rather than streams of data, such as Parallel Concatenated Convolutional Codes (PCCC or Turbo), Serially Concatenated Convolutional Codes (SCCC) Low Density Parity Check Codes (LDPCC), Turbo Product Codes (TPC) and other Turbo-Like Codes (TLC). Although all these codes differ significantly in terms of the code structure, they share some common features. First, they all operate on the data on a block basis, meaning that the data is not encoded in a continuous stream, but rather partitioned in blocks of a predetermined size. Second, all these codes use iterative decoding methods, therefore they generally require that a block of data is stored in memory and accessed several times before the results of the encoding and decoding processes become available. Finally it is well known that all these codes can achieve better performance against noise, but also better data rates as the data block size increases.

Therefore, there are many benefits associated with larger block sizes and it would be beneficial to be able to use as large of a block size as possible in all these cases. One obvious problem however that is related to all these coding structures is memory usage. Generally speaking, the memory usage directly translates to physical memory area on a chip (field programmable gate array (FPGA), application-specific integrated circuit (ASIC) or custom very-large-scale integration (VLSI) chip) that implements such a code and therefore higher implementation cost. With even small block sizes, it is often the case that the size of the processing logic in the implementation is comparable or even sometimes several times smaller than the size of the memory required for storing the data.

Designers are hence forced to trade between performance and memory area in order to achieve an implementation that can satisfy their requirements using less memory area. The purpose of this invention is to show that there exist special area-efficient memory types that are ideally suited for use in such coding structures so that the memory area cost associated with a given implementation is significantly smaller than the one required when using commonly used memory structures.

FIG. 1 is block diagram of a prior art parallel concatenated convolutional code (PCCC) FECC 100. PCCC 100 receives a single input signal and outputs two encoded output signals that each includes an encoded version of the input signal. To produce the first output signal, the input signal is convolutionally encoded prior to output. To produce the second output signal, the input signal is first interleaved and then convolutionally encoded prior to output.

PCCC 100 includes an interleaver 110, a first convolution code module (CC) 120, and a second convolution code module (CC) 130. PCCC 100 receives an input signal to be encoded, and the input signal is passed to interleaver 110 and to CC 120. CC 120 convolutionally encodes the input signal and outputs a first encoded output signal. Interleaver 110 interleaves the input signal and outputs the interleaved signal. CC 130 receives the interleaved signal as an input and convolutionally encodes the interleaved signal. CC 130 then outputs the encoded signal as the second encoded output signal.

Interleaving and convolutional encoding are two means of error correction that are well known in the art. Data interleaving may be used to protect against burst errors in a transmission that may overwrite a number of bits in a transmission. Data to be transmitted is often broken up into a plurality of control words and each of these control words may be self-correcting up to a certain number of bits. For example, an n-bit control word may be 1-bit self-correcting, meaning that if 1 bit of the n bits comprising the control word is overwritten or lost in transmission, the error can be detected and corrected. However, if an error comprising 2 or more bits occurs, the error cannot be self-corrected, and depending upon the decoding algorithm being applied the code word may either fail to be decoded or a the false positive may result where the decoding algorithm misidentifies the code word as a different code word due to the error.

The control words may then be interleaved to further protect against burst errors. For example, the i-th bit of each n-bit control words may be transmitted, then the i+1th bit of each n-bit control word may be transmitted, and so on until each bit of a group of the first n code words has been transmitted. Thus, if a burst error occurs, the number of bits lost from any one code word is likely to be minimized.

Convolutional coding is another type of self-correcting code. Convolutional encoding transforms an m-bit control word into an n-bit symbol (where n>m) and the transformation is a function of the last k information symbols with k being the constraint length of the code.

One skilled in the art will recognize that the methods for interleaving data and for convolutional encoding of data described herein are merely exemplary and that other methods for interleaving and convolutional encoding might also be used in alternative implementations.

FIG. 2 is a block diagram of a prior art serially concatenated convolutional code (SCCC) FECC 200. Like the PCCC described above, a SCCC includes two convolutional encoder modules and an interleaver, but instead of producing two separate encoded output signals, the input signal is serially encoded by both convolutional encoder modules.

SCCC 200 includes a first convolution coder module (CC) 210, an interleaver 220, and a second convolution coder (CC) module 230. CC 210 receives an input signal to be encoded and performs a first convolutional coding step on the data. CC 210 outputs the encoded data, and interleaver 220 receives the encoded data as an input. Interleaver 220 interleaves the data and outputs the interleaved data. CC 230 receives the interleaved data and performs a second convolutional coding step on the data. CC 230 then outputs the encoded data.

FIG. 3 is a block diagram of a prior art hybrid concatenated convolutional code (Hybrid CCC) FECC 300. Like PCCC 100 described above, hybrid CCC 300 produces two output data signals. The first output data signal is identical to the input signal, and the second output data signal is identical to that which is produced by SCCC 200 described above.

Hybrid CCC 300 includes a first convolutional code module (CC) 310, an interleaver 320, and a second convolutional code module (CC) 330. Hybrid CCC 310 produces a first output signal that is identical to the input signal. CC 310 also receives the input signal as an input. CC 310 performs a first convolutional encoding step on the input signal and outputs the encoded data. Interleaver 320 receives the encoded data as an input. Interleaver 320 interleaves the encoded data and outputs the interleaved data. CC 330 receives the interleaved data as an input and performs a second convolutional encoding step on the data. CC 330 then outputs the encoded data.

Typical FPGA and ASIC implementations of Forward Error Correcting Codes (FECC) use static RAM (SRAM). In most cases, especially in high performance/throughput implementation, most RAM blocks are dual-port, meaning they can be read from or written to by two sources simultaneously. RAM blocks are also typically fairly narrow in terms of bitwidth and deep if the block size is large. The size of the address decoders is fairly large and introduces a fairly large overhead to the entire memory area required for implementation.

FECC encoders and/or decoders may be integrated into numerous portable electronic devices such as laptop computers, mobile phones, and/or other portable devices that include electronic communications capabilities. The form factor of receiver and transmitter components may be directly impacted by components such as FECC encoders and/or decoders such as those described above. Electronics designers and manufacturers attempt to minimize the footprint of the individual components of the devices that they are designing and producing in order to minimize the manufacturing costs as well as minimize the form factor of the electronic device.

Accordingly, a solution that advantageously addresses the performance and implementations problems presented in conventional FECCs is desired.

BRIEF SUMMARY OF THE INVENTION

As described above, typical FPGA and ASIC implementations of Forward Error Correcting Codes (FECC) use static RAM (SRAM). In most cases, especially in high performance/throughput implementation, most RAM blocks are dual-port, meaning they can be read from or written to by two sources simultaneously. RAM blocks are also typically fairly narrow in terms of bitwidth and deep if the block size is large. The size of the address decoders is fairly large and introduces a fairly large overhead to the entire memory area required for implementation. Another type of memory that does not suffer this penalty is SAM (Sequential Access Memory). SAM is memory that can only be accessed in a known sequence. SAM includes local sequencers between memory word-lines to facilitate reading of the data instead of the address decoder used in RAM to locate and access data in the RAM. After each read the next word-line is activated and the memory can read the next value. Writing data to SAM is also performed in a sequential manner and is also facilitated by local sequencers between memory words.

The data in a typical FECC implementation has certain characteristics that make SAM particularly well suited for use in FECC implementations. For example, the data in FECC encoders and decoders are accessed in a predefined order in most implementations. Data stored in the various memory blocks of FECC encoders and decoders is typically accesses sequentially, with the exception of interleaver memories. Accordingly, the memory blocks of FECC encoders and decoders, with the exception of interleaver memories, may be implemented using SAM rather than RAM in order to significantly reduce the area of the design. Designers have a number of options for implementing FECC encoders and decoders using SAM. For example, according to one embodiment, one port on the memory is configured to work with sequencers as a SAM, while the other port is configured to work with regular address decoders such as that which is used with RAM. Furthermore, according to another embodiment, connections to the sequencers of the SAM could be modified such that the access sequence matches the interleaver pattern chosen for the implementation.

According to an embodiment, a method for utilizing memory to perform error correction code (ECC) operations is provided. The method includes generating data to be operated upon according to an ECC operation, writing the data to be operated upon to sequential access memory (SAM) that supports sequential access of data in a known order, where the data to be operated upon is written to the SAM according to a first predetermined pattern, reading the data to be operated upon from the SAM, wherein the data to be operated upon is read from the SAM according to a second predetermined pattern, and performing the ECC operation on the data read from the SAM.

Other features and advantages of the invention will be apparent in view of the following detailed description and preferred embodiments.

BRIEF DESCRIPTION OF THE DRAWINGS

FIG. 4 is a block diagram of an encoder according to an embodiment.

FIG. 5 is a block diagram of a decoder according to an embodiment.

DETAILED DESCRIPTION OF THE INVENTION

Figure 1:
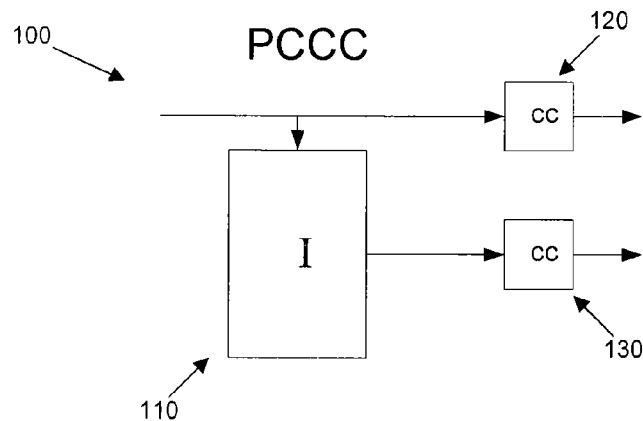
FIG. 1 is block diagram of a prior art parallel concatenated convolutional code FECC.
Figure 2:
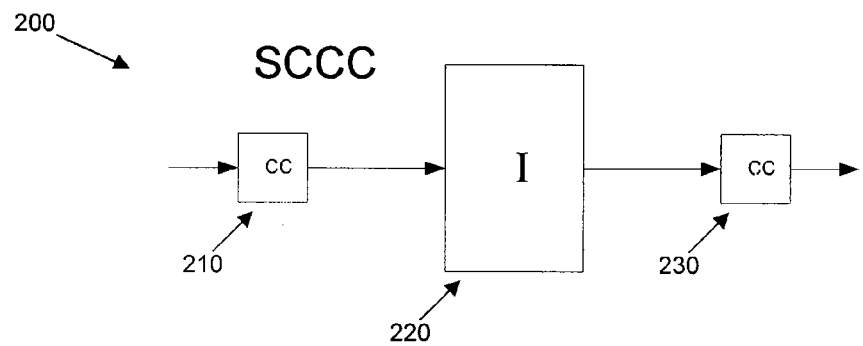
FIG. 2 is a block diagram of a prior art serially concatenated convolutional code FECC.
Figure 3:
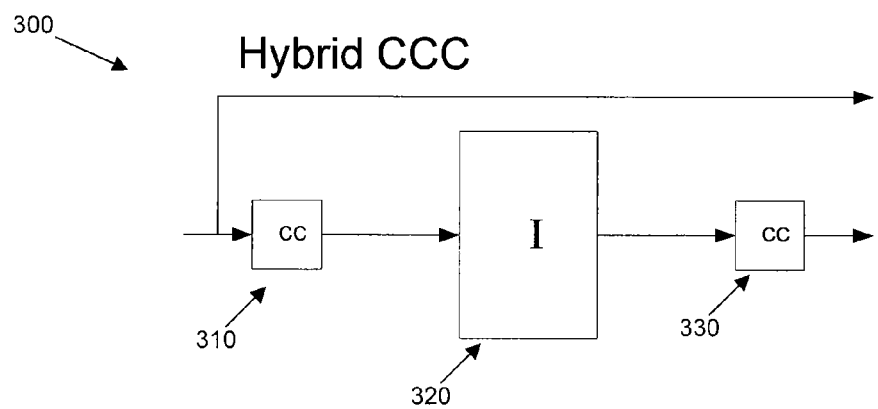
FIG. 3 is a block diagram of a prior art hybrid concatenated convolutional code FECC.

In current implementations of FECCs designers presently use RAM (Random Access Memory) to implement the various memory blocks in FECC encoders and decoders. RAM in commonly used in many electronics implementations, since the order in which the memory locations are accessed in does not need to be predefined. However this capability to access data randomly comes at the cost of special circuitry that is required to translate the requested address into the right enable signals (wordlines and bitlines) for the RAM to be able to access the right memory cells.

Most of the data stored in a typical FECC implementation is accessed sequentially, with the exception of data stored in interleaver memories. Therefore, sequential access memory (SAM) may be advantageously used instead of RAM to implement memory blocks of FECC encoders and decoders, with the exception of interleaver memory blocks. SAM may be implemented using the same memory cells as RAM but without the address translation circuitry that is included in RAM. Memory accesses in SAM are more efficient than in RAM because bulky address decoding circuits that are associated with each port of the RAM are replaced by a set of sequencers that ensure that the next word of the memory is enabled before each memory access. The sequencers are interconnected in such a manner that the enabling process is local between sequential address locations, and as a result this process is much faster than the address decoding operation performed by RAM, which requires access to all of the wordlines in the entire memory array.

Accordingly, the memory blocks of FECC encoders and decoders, with the possible exception of interleaver memories, may be advantageously implemented using SAM rather than RAM in order to significantly reduce the area of the design, reduce the power requirement of the design, and increase the speed at which memory accesses may be performed, which may result in increased speed for the entire circuit.

As described above, FECCs partition data into blocks of a predetermined size which are then encoded. Encoding is typically one of the last data processing steps performed by a transmitter before the data is transmitted. Encoding logic is typically integrated into the physical (PHY) layer of the transmitter.

During the encoding process, supplemental data to aid the receiver in determining if errors were introduced into the data during transmission are appended to the data comprising information to be transmitted. This additional data, usually referred to as parity information, is a function of the original data and is generated using an error correcting code, such as PCCC, SCCC, LDPCC or TLC.

The complexity of error correcting codes has continued to increase, and as a result, the amount of memory required to support these error correcting codes has also increased due to the size and complexity of the data structures used by these codes. As the complexity of these codes has increased, both the encoding and decoding data structures have typically increased substantially in size and complexity. However, the impact on the decoder structure size is typically greater, since each original bit of data corresponding to information to be transmitted is often represented by a metric that is several bits wide in the decoder structure. As a result, constraints on memory may be even greater in a receiver performing decoding than in a transmitter that has encoded the original signal.

A typical FECC encoder structure has several memory structures to store data at the various points of processing, including an input buffer, an interleaver memory, a pre-transmission memory, and/or last-in first-out (LIFO) or first-in first-out (FIFO) buffers in used in various subcomponents for use in data throttling. According to some embodiments, the encoder may have an input buffer for buffering the incoming data before the data is processed. An input buffer is, however, a performance-driven optional feature and may not be included in some low-throughput embodiments.

Interleaver memories are a second type of memory structure typically found in advanced FECCs, such as PCCC, SCCC, LDPC, TLC, and TPC. According to some embodiments, an interleaver memory may be implemented as a single block, while in other embodiments, the interleaver memory may be implemented a several blocks of memory. The implementation selected for the interleaver memory may depend, at least in part, on the throughput requirements of the system.

Advanced FECCs also typically include another memory structure for storing bits to be transmitted prior to the formation of final symbols to be transmitted across a channel. According to some embodiments, interleaving may also be performed on the data in this pre-transmission memory.

Some embodiments of FECCs may also include various FIFO buffers incorporated into subcomponents of the FECCs. The FIFO buffers are typically smaller than the other memory structures described above and are used to provide data throttling capabilities to the various subcomponents by regulating the flow of data into and/or out of the various subcomponents of the FECCs. The properties of the various memory blocks included in a FECC are described in greater detail below. The FIFO buffers are not described separately as these buffers share many of properties of the other major memory blocks that may be included in an FECC.

FIG. 4 is a block diagram of an SCCC FECC encoder according to an embodiment. Encoder 400 comprises input 410, input memory buffer 420, convolution code unit (CC) 430, interleaver memory 440, convolution code unit (CC) 450, output buffer memory 460, and output 470.

Data flows in one direction in the encoder from input 410 to output 470. As data flows from input 410 toward output 470, the data is only written to and read from memory at each of the memory blocks: input buffer memory 420, interleaver memory 440, and output memory buffer 460. According to some embodiments, encoder 400 may also include FIFO buffers in one or more of the encoder components, such as CC 430 and/or CC 450 for controlling the flow of data into these components.

One skilled in the art will recognize that the same building blocks described for FIG. 4 could also be used to implement other types of encoders such as the PCCC and the Hybrid CCC described above.

CC 430 reads data from input memory 420, encodes the data, and writes the data interleaver memory 440. CC 450 then reads the encoded data from interleaver memory 440, performs a secondary encoding step on the encoded data, and writes the modified encoded data to output buffer memory 460. The encoded data is read out of output buffer memory 470 and output to modulator 470 that modules a carrier signal in order to convey the encoded data to a receiver. The structures of the modulator and other downstream components that may be included in a system including the modulator have been omitted.

According to some embodiments, input memory buffer 420 of the FECC may essentially function as a FIFO buffer. The output buffer may also function as a FIFO buffer in some embodiments. However, in some alternative embodiments, output memory buffer 460 may include channel interleaving functionality, which is typically implemented by writing data into memory sequentially and then reading the data out in an interleaved pattern. Furthermore, according to yet other embodiments, the data may instead be read out sequentially and during the write process data is written into a non-sequential pattern.

According to an embodiment, not only can input memory buffer 420 and output memory buffer 470 be implemented using SAM, interleaver memory 440 used for interleaving operations may also be implemented using SAM. Since the interleaver pattern is known in advance, the sequencer interconnect in the SAM may be modified so that it implements the desired interleaving function. In a design that needs to implement several interleaving functions in the same memory module, hybrid memories could be designed that have sequential access capability on one port and random access capabilities on the other port. This hybrid approach will still save a substantial amount of area when compared to an implementation using a RAM with two ports.

According to some embodiments, it is possible that the FECC designer may select SAMs that do not match the block size of the data to be processed. Accordingly, embodiments of the present invention include a reset function that the designer can used to reset the SAMs to the original position at the end of the block. Furthermore, in embodiments where the block size of the SAMs and the block size of the data to be used are equal, the sequencing interconnect may be made circular, so that an access to the last location automatically enables the first memory location again.

In a typical advanced FECC decoder structure, there are typically three large memory structures that constitute the bulk of the memory space of the design, and usually many other smaller ones within the decoder that serve as LIFOs, FIFOs, etc. inside sub-modules for data ordering, alignment or throttling. Since those smaller memories are usually negligible in size compared to the large blocks, and on top of that the same properties that apply to the larger memory blocks apply to such smaller ones, details of such smaller memories are not discussed further but may be understood by one of skill in the art in view of the present disclosure.

In earlier FECCs the data is only decoded once. However in advanced FECC solutions the decoding process is iterative meaning that the data for a particular block that gets transmitted is iterated upon several times before making any decisions. The present invention is particularly beneficial to implementations of this category of decoders, since iterative decoders use soft metrics to represent the probabilities of the bits that were transmitted instead of the actual bit values. They also need to store the entire block of information for the iterative process, therefore, they use a lot more memory than older FECCs that would make binary decisions immediately based on the input from the channel.

FIG. 5 is a block diagram of a decoder according to an embodiment. Decoder 500 comprises input 510, input memory buffer 520, soft-input/soft-output unit (SISO) 530, interleaver/de-interleaver memory 540, soft-input/soft-output unit (SISO) 550, output memory buffer 560, and output 570. Decoder 500 receives input data to be decoded, such as data encoded by encoder 400 described above, via input 510. The input data from input 510 is stored in input buffer memory 520.

Data flows through de-interleaver memory 540 in both directions in decoder 500, because the decoding process, unlike the encoding process, is iterative. SISO 530 and SISO 550 perform multiple iterations on the data in order to determine in order to identify which symbol was received by the decoder. Once an acceptable level of certainty has been reached, the symbol is identified and the decoding process continues with the next received symbol.

In addition to encoder memory structures, the memories of the decoder may also be accessed sequentially. Special attention may be needed to implement interleaving functions. In this case, since the inverse functions are performed here the interleaving function could exist in the input buffer (if channel interleaving is embedded in its functionality) and in the interleaver/de-interleaver memory. Output memory buffer 560 and usually all small local memories could be made out of SAM since they are accessed sequentially. In most cases input memory buffer 520 is also written into and read from sequentially and in that case it could be implemented as a SAM as well. In the case that interleaving is embedded in its function then the write port may need to be sequenced according to the inverse of the channel interleaving pattern. In one embodiment, if multiple patterns are necessary, this port may be designed to be capable of random accesses, using a hybrid implementation. The most complex structure of the decoder is typically interleaver/de-interleaver memory 540.

In order to achieve maximum memory utilization the interleaver/de-interleaver memory space should be shared, according to an embodiment of the invention. Thus, the interleaver and de-interleaver functions should be performed in the same memory block, such as interleaver/de-interleaver memory 540 described above.

An additional complication is that read and write operations may need to be performed simultaneously. Therefore, in order to enable simultaneous reads and writes, data should be written back to the same location from which the data is read in order to overwrite existing data. In order to use SAM for the interleaver/de-interleaver memory 540, the memory should have two ports each capable of accessing the memory space using two different access patterns: on pattern being sequential access and the other being an interleaver pattern. When the interleaver is operating in the reverse direction (de-interleaving), both ports of the SAM would be configured to use a sequential access pattern with one port performing read operations while the other port performs write operations. When the interleaver is operating in the forward direction (interleaving), one port should be used for performing read operations and the other should be configured to perform write operations. Both ports should also be configured to use an interleaver function for accessing data rather than the sequential access.

The switch from interleaving to de-interleaving and the switch from de-interleaving to interleaving should only have to be performed once each per iteration. According to some embodiments, a single multiplexer is included for each set of sequencers in order to enable the switch from interleaving to de-interleaving mode and vice versa. One sequencer interconnect is then selected when the interleaver/de-interleaver block is performing the interleaver function and the other interconnect is selected when the block is performing the de-interleaver function. Each function will have a different starting location in the memory, so embodiments also include a separate reset function for each mode to properly position the pointers before the start of each operation.

SAM may not be appropriate for use in implementing the de-interleaver/interleaver memory, however, in embodiments that include multiple interleavers due to the complexity of implementing the control logic to ensure that the appropriate pointers are reset to the appropriate location before beginning each new operation.

According to some embodiments, the operation of the interleaver may be reversed with sequential access performed in the forward direction and de-interleaver patterns performed in the backward direction.

The various embodiments described above illustrate that the use of SAM instead of RAM in the memory modules of FECC encoders and/or decoders is advantageous, since all information in both the encoder and decoder structures is accessed in a known sequence. Thus, the use of SAM instead of RAM would advantageously eliminate the latency overhead introduced by address decoding disappear, yielding much faster and area efficient designs.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for utilizing memory to perform error correction code (ECC) operations, the method comprising:
   obtaining data to be operated upon according to an ECC operation; writing the data to be operated upon to sequential access memory (SAM), where the data to be operated upon is written to the SAM according to a first predetermined memory location pattern;
   reading the data to be operated upon from the SAM, wherein the data to be operated upon is read from the SAM according to a second predetermined memory location pattern; and
   performing the ECC operation on the data read from the SAM, wherein in a first direction of a forward-backward iterative decoding scheme, the SAM is accessed according to a predetermined memory location pattern representing an interleaving operation, and in a second direction of the forward-backward iterative decoding scheme, the SAM is accessed according to a predetermined memory location pattern representing a de-interleaving operation.

2. The method of claim 1 wherein the first predetermined memory location pattern is identical to the second predetermined memory location pattern.

3. The method of claim 1 wherein the first predetermined memory location pattern is different from the second predetermined memory location pattern.

4. The method of claim 1 wherein the SAM is used to implement an input buffer.

5. The method of claim 1 wherein the SAM is used to implement an output buffer.

6. The method of claim 1 wherein the SAM is accessed using a first port and a second port, each of the first and second ports is capable of accessing data in the SAM according to at least two different predetermined memory location patterns.

7. An apparatus configured to utilize memory to perform error correction code (ECC) operations, the apparatus comprising:
   sequential access memory (SAM); and
   an ECC module comprising:
      logic to obtain data to be operated upon according to an ECC operation;
      logic to write the data to be operated upon to the sequential access memory, where the data to be operated upon is written to the SAM according to a first predetermined memory location pattern;
      logic to read the data to be operated upon from the SAM, wherein the data to be operated upon is read from the SAM according to a second predetermined memory location pattern; and
      logic to perform the ECC operation on the data read from the SAM, wherein in a first direction of a forward-backward iterative decoding scheme, the ECC module is configured to access the SAM according to a predetermined memory location pattern representing an interleaving operation, and in a second direction of the forward-backward iterative decoding scheme, the ECC module is configured to access the SAM to a predetermined memory location pattern representing a de-interleaving operation.

8. The apparatus of claim 7 wherein the first predetermined memory location pattern is identical to the second predetermined memory location pattern.

9. The apparatus of claim 7 wherein the first predetermined memory location pattern is different from the second predetermined memory location pattern.

10. The apparatus of claim 7 wherein the SAM is used to implement an input buffer.

11. The apparatus of claim 7 wherein the SAM is used to implement an output buffer.

12. The apparatus of claim 7 wherein the ECC module is configured to access the SAM using a first port and a second port, each of the first and second ports is capable of accessing data in the SAM according to at least two different predetermined memory location patterns.

* * * * *